United States Patent Office 2,709,429
Patented May 31, 1955

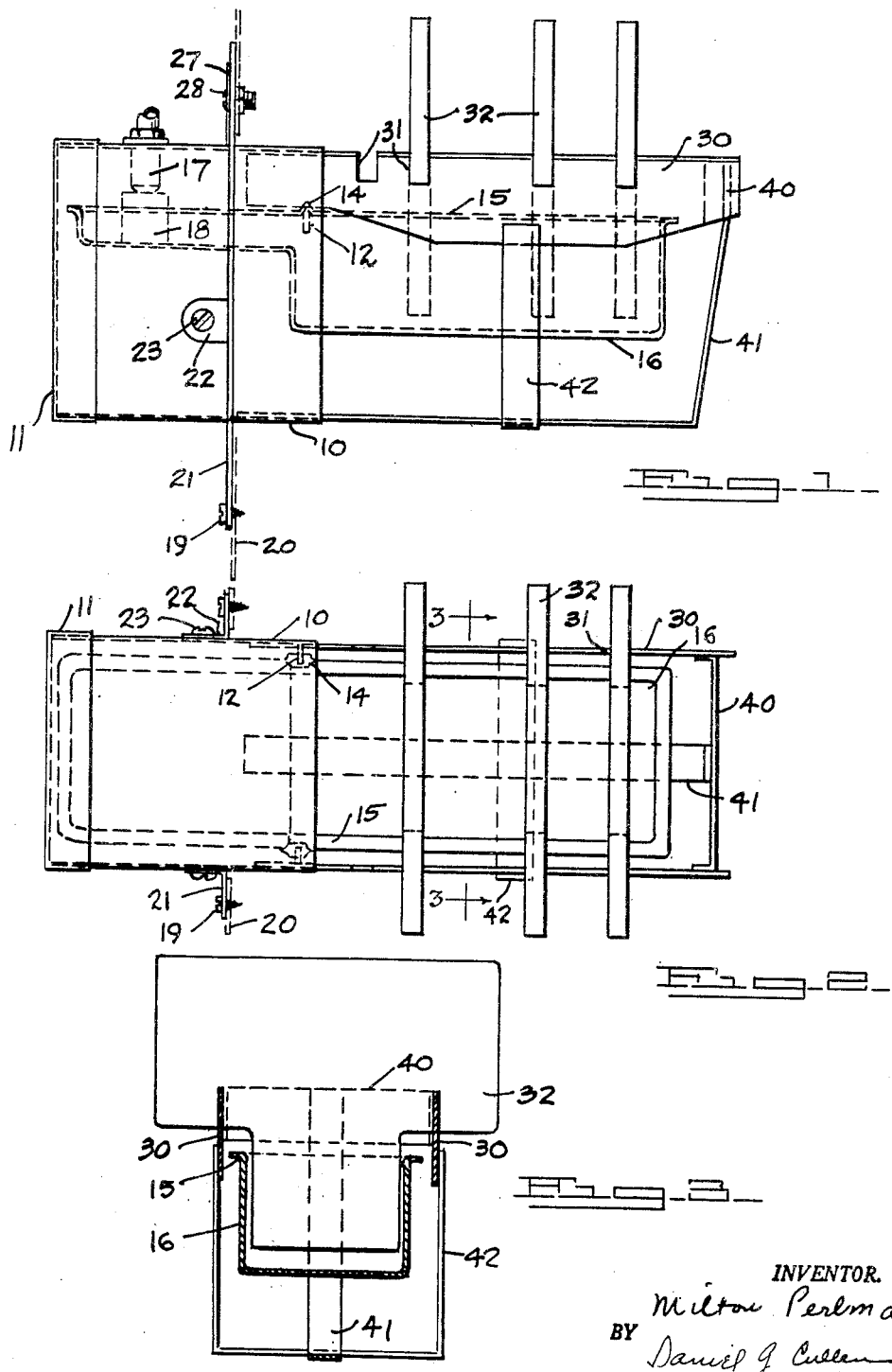

2,709,429

HUMIDIFIERS HAVING BASKET MEANS FOR PAN AND PLATES

Milton Perlman, Detroit, Mich.

Original application April 21, 1951, Serial No. 222,240. Divided and this application August 20, 1954, Serial No. 451,106

4 Claims. (Cl. 126—113)

This application relates to tiltable pan humidifiers, an example of which is shown in the patent to Perlman 2,588,567 of March 11, 1952.

This application is a division of application Serial No. 222,240 filed April 21, 1951, entitled Humidifier, in turn a continuation in part of application Serial No. 150,880 filed March 21, 1950, and now Patent No. 2,588,567 of March 11, 1952.

One object of the present invention is to provide a basket means lying under the pan and evaporator plates of a tiltable pan humidifier for guarding against accidental removal of the pan and the plates from the humidifier.

Other objects of the invention will become apparent by reference to the following detailed description taken in connection with the accompanying drawing in which Fig. 1 is a longitudinal side elevation view of a humidifier embodying the invention and mounted on and through a wall.

Fig. 2 is a plan view.

Fig. 3 is a section view as if on line 3—3 of Fig. 2.

The drawing shows a pan support 10 in the form of a hollow box having open forward and rear ends with the open forward end being closed by a removable snap-on cover 11. The vertical sides of the box are formed with lugs 12 whose upper edges provide pivotal bearings for V-shaped formations 14 of the horizontal flange 15 of a water pan or reservoir 16, whereby the latter is removably and pivotally mounted in the support 10 on a horizontal transverse axis 12—14 between the longitudinally spaced ends of the pan.

At 17 is shown a nozzle of water supply line connected to the top wall of the support 10 forward of the pivotal axis 12—14.

The pan 16 tilts and balances itself on its pivot axis 12—14 according to the quantity of water in the rear end of such pan. When the pan is full a stopper 18 in the forward end of the pan engages the nozzle 17 of the inlet line to close it. Conversely, when the pan is not adequately filled, water pressure in the line 17 will tilt the pan counterclockwise to open the nozzle and admit water. This is characteristic of the action of a tilting pan humidifier.

It will be observed that the pan is removably mounted within the box support on its pivot axis 12—14 with access into the box support for such purpose being provided by removal of the snap-on cover 11 closing the forward open end of the box.

A mounting means for support 10 is provided which is adapted to be secured by screws 19 against a wall 20 of a furnace or duct and for thus mounting the support 10 in a hole of that wall. Such mounting means comprises a U-shaped mounting plate 21 extending along the bottom and sides of the box support 10 and having lugs 22 connected to the sides of the box by screws 23 in openings of lugs 22, with the free ends of the U-shaped plate 21 extending above the box support. An anchor plate 27 bridges and is connected to the upper ends of the sides of the mounting plate 21 by screws 28 and thus clamps the support 10 to the mounting plate 21 for proper mounting of the support 10 in the wall 20.

For facilitating evaporation of water from the water pan 16, there are provided evaporator plates and an evaporator plate support. These will now be described.

The evaporator plate support comprises two parallel arms 30 lying over but near the longitudinal edges of the pan 16 and connected to the pan support 10 cantileverwise and extending rearwardly from such support 10. At suitable points along such arms 30 are formed notches 31 in selected ones of which may be disposed T-shaped evaporator plates 32 of suitable evaporator plate material, with the cross bars of the T's resting upon the arms 30 and with the shanks of the T's depending in the pan 16 to dip into the water therein and thus function as evaporators or wicks.

The evaporator plates 32 and their supports 30 are out of contact with the pan whereby to permit free tilting of the pan in the pan support 10.

The pan support 10 is a hollow box open at the forward and rear ends and large enough (4 inches square) to enable manipulation of the plates 32 and thus to enable the plates to be disposed upon or removed from the plate supports 30 through the pan support 10 whenever it is desired to manipulate the plates 32 for removal or replacement.

The pan 16 is removably mounted in the pan support 10 on the lugs 12 and the pan is likewise manipulable for removal from the pan support and for insertion therein through the hollow box pan support 10.

When it is desired to manipulate the plates 32 through the pan support 10, it is preferable first to remove the pan 16 from its support 10 thus to give clear passageway through such support for one's hands and arms and for the plates 32.

The V-shaped formations 14 of the flange 15 of the pan project laterally slightly beyond the main portion of the flange 15 to facilitate mounting of such V-formations upon the upper edges of the lugs 12 which removably and tiltably mount the pan in the pan support 10.

In order to prevent the pan 16 and the plates 32 from dropping accidently into the furnace behind wall 20, a suitable guard means is provided and this will now be described. The guard means comprises a basket formed by straps 40, 41 and 42 together with the arms 30 and the support 10. Strap 40 connects the free ends of the arms 30. Strap 41 connects strap 40 and the pan support 10 and inhibits rearward movement of the pan as well as downward movement of the pan accidently into the furnace. Strap 42 connects arms 30 to each other and also to strap 41 and prevents and inhibits sidewise movement of the pan 16 and thus dropping the pan accidently into the furnace.

The basket formed by straps 40, 41 and 42 with arms 30 and pan support 10 also guards against accidental dropping of the plates 32 into the furnace.

Now having described the humidifier hereof, reference should be had to the claims which follow:

I claim:

1. A humidifier of the tilting pan type for mounting in a wall comprising a pan support, means for mounting said pan support in said wall, a water pan tiltably mounted in said pan support on a horizontal transverse axis between its ends, a water supply line connected to said support forward of said axis, above the forward end of the pan, means operatively associated with said water supply line and said pan for opening and shutting off the water supply in response to downward and upward tilting of the forward end of said pan, an evaporator plate support connected to said pan support cantileverwise and extending rearwardly therefrom and having a part above the level of the top of the rear portion of said pan and being adjacent said pan, and evaporator plates resting on said plate support part and having portions depending into the rear portion of the pan, the plates and the plate support being out of contact with said pan to permit free tilting thereof in the pan support, and means forming with the pan support and the plate support a basket lying in part under the pan and the plates for guarding against accidental dropping of the pan or the plates from the pan support and the plate support, such means comprising straps connecting the pan support and the plate support and having portions lying under the pan and plate support.

2. A humidifier of the tilting pan type for mounting in a wall comprising a pan support, means for mounting said pan support in said wall, a water pan tiltably mounted in said pan support on a horizontal transverse axis between its ends, a water supply line connected to said support forward of said axis above the forward end of the pan, means operatively associated with said water supply line and said pan for opening and shutting off the water supply in response to downward and upward tilting of the forward end of said pan, an evaporator plate support comprising two parallel arms each connected to said pan support cantileverwise and extending rearwardly therefrom and each having a part above the level of the top of the rear portion of said pan said arms being near the longitudinal edges of the pan, and evaporator plates resting on said plate support arm parts and having portions depending into the rear portion of the pan the plates and plate support being out of contact with said pan to permit free tilting thereof in the pan support, the plates being T-shaped with the cross bar of the T resting on such arms and the shank of the T depending in the pan, and means forming with the pan support and the plate support a basket lying in part under the pan and the plates for guarding against accidental dropping of the pan or the plates from the pan support and the plate support, such means comprising straps connecting the pan support and the plate support and having portions lying under the pan and plate support.

3. A humidifier of the tilting pan type for mounting in a wall comprising a pan support, means for mounting said pan support in said wall, a water pan tiltably mounted in said pan support on a horizontal transverse axis between its ends, a water supply line connected to said support forward of said axis, above the forward end of the pan, means operatively associated with said water supply line and said pan for opening and shutting off the water supply in response to downward and upward tilting of the forward end of said pan, an evaporator plate support connected to said pan support cantileverwise and extending rearwardly therefrom and having a part above the level of the top of the rear portion of said pan and being adjacent said pan, and evaporator plates resting on said plate support part and having portions depending into the rear portion of the pan, the plates and the plate support being out of contact with said pan to permit free tilting thereof in the pan support, the pan support being a hollow box open at its forward and rear ends to enable the plates to be disposed upon and removed from the plate support through said pan support, and means forming with the pan support and the plate support a basket lying in part under the pan and the plates for guarding against accidental dropping of the pan or the plates from the pan support and the plate support, such means comprising straps connecting the pan support and the plate support and having portions lying under the pan and plate support.

4. A humidifier of the tilting pan type for mounting in a wall comprising a pan support, means for mounting said pan support in said wall, a water pan tiltably mounted in said pan support on a horizontal transverse axis between its ends, a water supply line connected to said support forward of said axis, above the forward end of the pan, means operatively associated with said water supply line and said pan for opening and shutting off the water supply in response to downward and upward tilting of the forward end of said pan, an evaporator plate support connected to said pan support cantileverwise and extending rearwardly therefrom and having a part above the level of the top of the rear portion of said pan and being adjacent said pan, and evaporator plates resting on said plate support part and having portions depending into the rear portion of the pan, the plates and the plate support being out of contact with said pan to permit free tilting thereof in the pan support, the pan support being a hollow box open at its forward and rear ends to enable the plates to be disposed upon and removed from the plate support through said pan support, the pan being removably mounted in said pan supports and manipulable for removal from and insertion therein through said pan support, and means forming with the pan support and the plate support a basket lying in part under the pan and the plates for guarding against accidental dropping of the pan or the plates from the pan support and the plate support, such means comprising straps connecting the pan support and the plate support and having portions lying under the pan and plate support.

References Cited in the file of this patent

UNITED STATES PATENTS

| | | |
|---|---|---|
| 1,720,241 | Sallada | July 9, 1929 |
| 1,817,357 | Fisher | Aug. 4, 1931 |
| 2,557,042 | Woolley | June 12, 1951 |
| 2,565,210 | Dovolis | Aug. 21, 1951 |
| 2,573,158 | Muth | Oct. 30, 1951 |
| 2,585,764 | Getz | Feb. 12, 1952 |